US008913869B2

(12) United States Patent
Kano

(10) Patent No.: US 8,913,869 B2
(45) Date of Patent: Dec. 16, 2014

(54) VIDEO PLAYBACK APPARATUS AND VIDEO PLAYBACK METHOD

(75) Inventor: Jun Kano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/567,319

(22) Filed: Aug. 6, 2012

(65) Prior Publication Data
US 2013/0163948 A1 Jun. 27, 2013

(30) Foreign Application Priority Data

Dec. 22, 2011 (JP) .................................. 2011-281117

(51) Int. Cl.
*H04N 5/92* (2006.01)

(52) U.S. Cl.
USPC ........................................... 386/241; 386/239

(58) Field of Classification Search
None
See application file for complete search history.

(56) References Cited

U.S. PATENT DOCUMENTS

| 2010/0122309 A1* | 5/2010 | Kawakami et al. ............ 725/116 |
| 2012/0079073 A1* | 3/2012 | Kojima .......................... 709/217 |
| 2012/0124620 A1* | 5/2012 | Nishizawa et al. ............. 725/34 |

FOREIGN PATENT DOCUMENTS

| JP | 2006-157687 | 6/2006 |
| JP | 2008-028529 | 2/2008 |
| JP | 2009-212630 | 9/2009 |
| JP | 2011-176875 | 9/2011 |

OTHER PUBLICATIONS

Japanese Patent Application No. 2011-28117, Notice of Reasons for Rejection, mailed Oct. 9, 2012, (with English Translation).

* cited by examiner

*Primary Examiner* — William C Vaughn, Jr.
*Assistant Examiner* — Eileen Adams
(74) *Attorney, Agent, or Firm* — Blakely, Sokoloff, Taylor & Zafman LLP

(57) ABSTRACT

According to one embodiment, a video playback apparatus includes a recorder, storage, a setter, a classifier and a display controller. The setter is configured to set a keyword for searching for a comment on the program recorded by the recorder, from the comments stored in the storage. The classifier is configured to classify on which program recorded by the recorder the comment stored by the storage is made, based on the keyword set by the setter. The display controller is configured to, when playing back the program recorded by the recorder, perform control to display the comment classified by the classifier as a comment on the program, and the program.

20 Claims, 7 Drawing Sheets

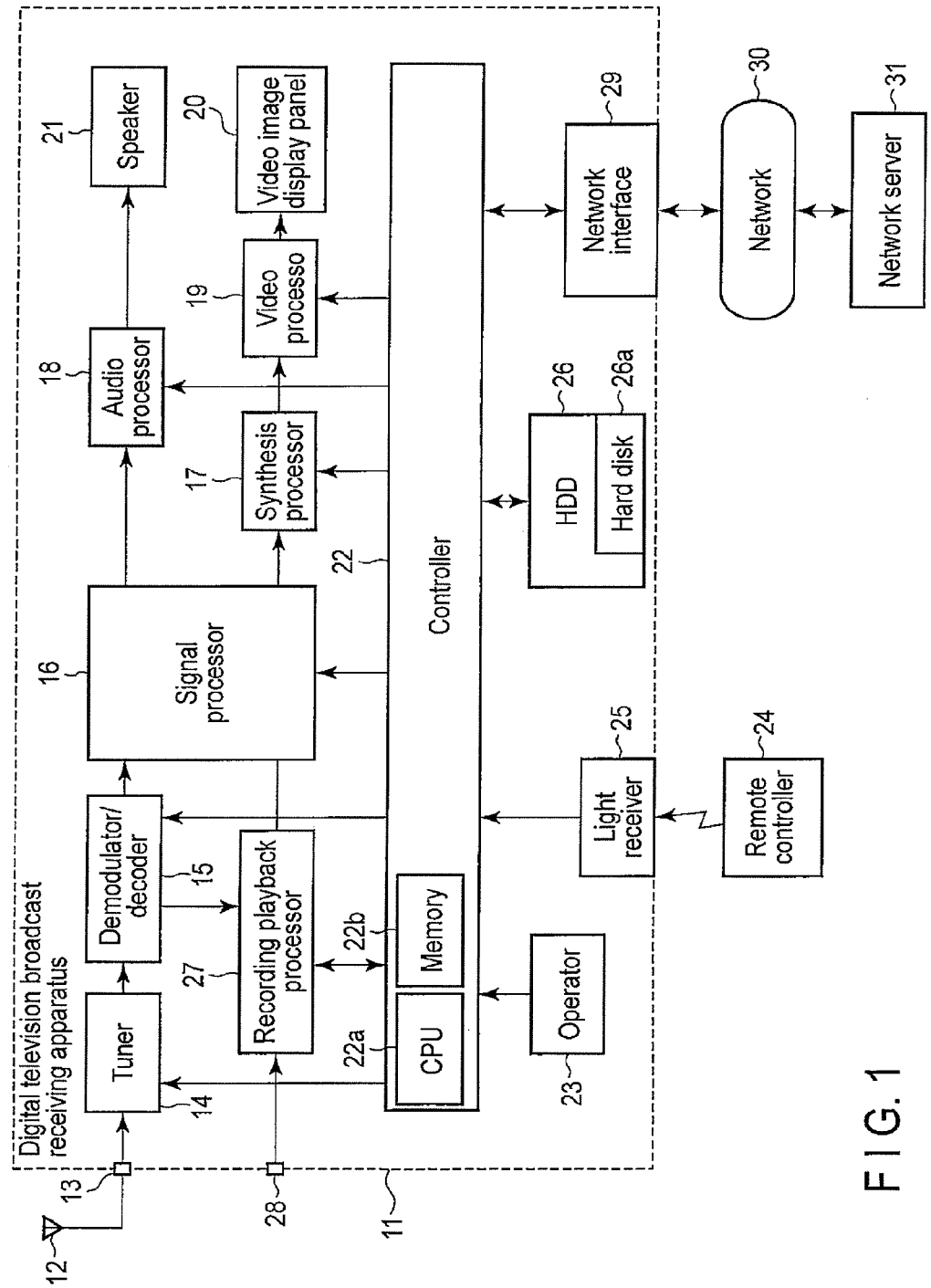
F I G. 1

| Service ID | Network ID | Reference keyword |
|---|---|---|
| 12345 | 32112 | #QBS |
| 12347 | 48 | #TVKANTO |
| 10481 | 1048 | #TOSHITV |
| 117117 | 2 | #MUKASHITV |

Comment

| Posting time | Poster | Comment |
|---|---|---|
| 2011/09/15 21:00:01 | kapincho | Oh, white show has begun. #QBS #whiteshow |
| 2011/09/15 21:00:12 | yumimaru | Today's guest is Lucky  #QBS #whiteshow |
| 2011/09/15 21:00:31 | boofoo | Disaster restoration is quite slow .... #QBS #news777 |
| 2011/09/15 21:00:57 | xxxyyyzzz | HH is going wild today, too  #QBS |
| 2011/09/15 21:02:03 | kapincho | You don't usually go to the Himalayas  #QBS #whiteshow |
| 2011/09/15 21:02:48 | t2 | [RT if you like] We are gonna have a live concert in Shibuya on 18. For more information, please check http://********  #QBS #TVKANTO #TOSHITV #MUKASHITV |
| ... | ... | ... |
| 2011/09/15 21:54:58 | bowwow | We will have "ciaosports" next!- #QBS #TOSHITV |

(a)

Characteristic keyword

| Keyword | #QBS | #whiteshow | Lucky | White show | Chimmers | ... | #news777 |
|---|---|---|---|---|---|---|---|
| Number of times of appearanc | 421 | 319 | 287 | 112 | 90 | ... | 8 |

(b)

F I G. 5

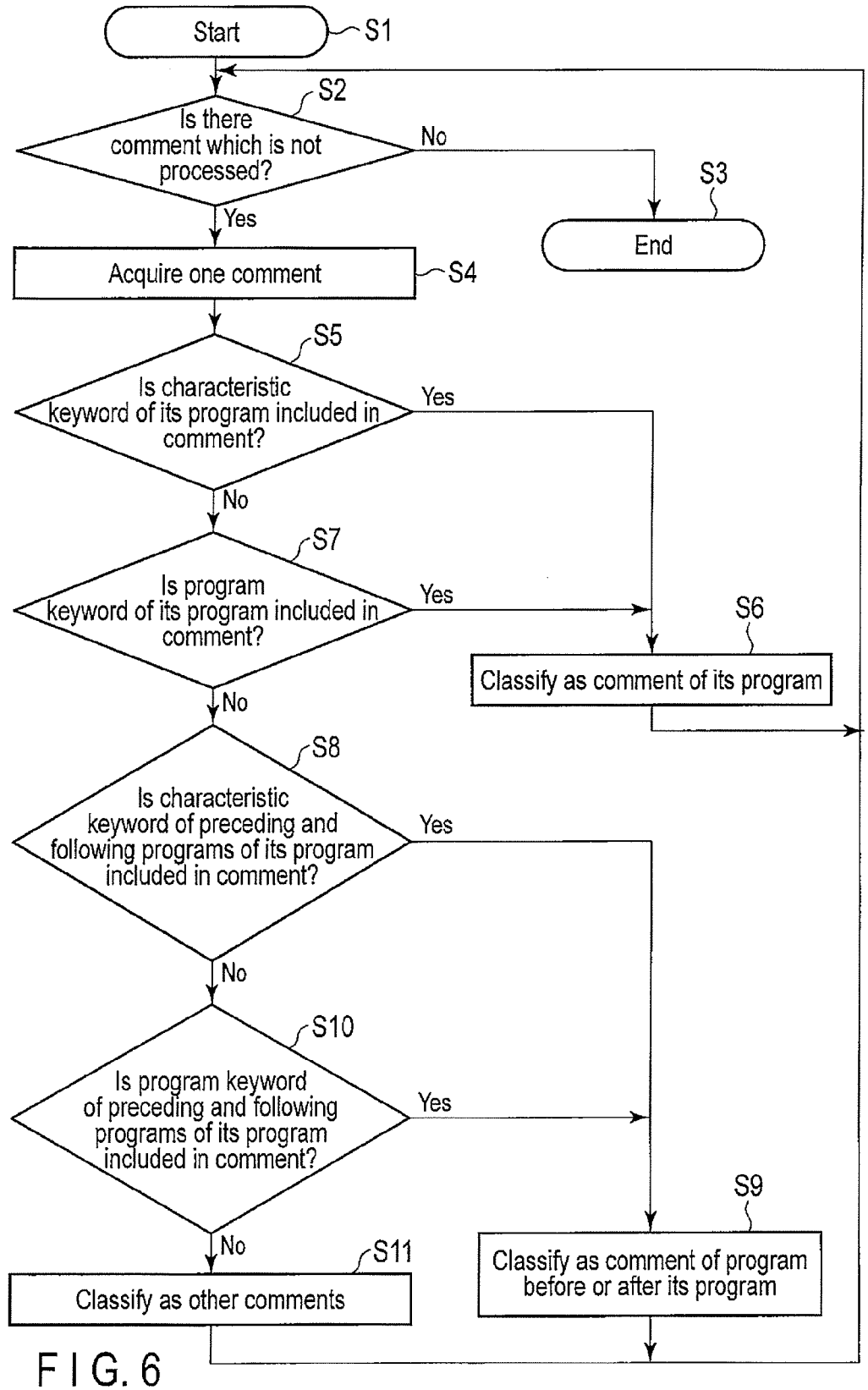
F I G. 6

Characteristic keyword of news 777

| Keyword | #QBS | #news777 | Announcer Mori | Typhoon | Heavy rain | ... | #whiteshow |
|---|---|---|---|---|---|---|---|
| Number of times of appearance | 38 | 22 | 18 | 11 | 7 | ... | 2 |

Characteristic keyword of world funny shock special of white sauce

| Keyword | #QBS | #whiteshow | Lucky | White show | Chimmers | ... | #news777 |
|---|---|---|---|---|---|---|---|
| Number of times of appearance | 421 | 319 | 287 | 112 | 90 | ... | 8 |

Characteristic keyword of world farm tour biomass energy and corn field in America

| Keyword | #QBS | Corn | America | Biomass | #worldfarm | ... | Rat |
|---|---|---|---|---|---|---|---|
| Number of times of appearance | 122 | 38 | 35 | 22 | 18 | ... | 4 |

F I G. 7

VIDEO PLAYBACK APPARATUS AND VIDEO PLAYBACK METHOD

CROSS-REFERENCE TO RELATED APPLICATIONS

This application is based upon and claims the benefit of priority from prior Japanese Patent Application No. 2011-281117, filed Dec. 22, 2011, the entire contents of which are incorporated herein by reference.

FIELD

Embodiments described herein relate generally to a video playback apparatus such as a digital television broadcast receiving apparatus, and a video playback method.

BACKGROUND

As is widely known, a so-called broadcasting/communication collaboration system is actively being developed which provides new services combining broadcasting and communication by making the most of a communication service using, for example, a network such as an Internet Protocol (IP) service with an existing broadcasting service as a starting point.

According to this broadcasting communication/collaboration system, by simultaneously multiscreen-displaying a broadcast program and related information distributed through broadcasting or a network with a corresponding digital television broadcast receiving apparatus, or collaborating via a cloud on the network, it is possible to simultaneously multiscreen-display content of a cloud service such as Twitter and a broadcast program.

Particularly, a community-type web site such as a social networking service (SNS) which is intended for wide mutual communication by self-publicizing member users has recently spread, so that it is possible to simultaneously multiscreen-display and view comments communicated on the SNS and a broadcast program.

Meanwhile, a service provider of a communication service such as this SNS does not provide a mechanism for identifying a broadcast channel or a broadcast program on a service provider side, and therefore this service identifies on which broadcast channel or broadcast program which comment is made by assigning a specific character sequence indicating a broadcast channel or a broadcast program, to a comment by a user of the service.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram for schematically illustrating an example of a signal processing system of a digital television broadcast receiving apparatus according to an embodiment;

FIG. 5 is a view for illustrating an example of a processing operation performed by the controller of the digital television broadcast receiving apparatus according to the embodiment for extracting a characteristic keyword;

FIG. 6 is a flowchart for illustrating an example of a main processing operation performed by the controller of the digital television broadcast receiving apparatus according to the embodiment;

FIG. 7 is a view for illustrating an example of a processing operation performed by the controller of the digital television broadcast receiving apparatus according to the embodiment for classifying a comment.

DETAILED DESCRIPTION

Figures 2, 3:
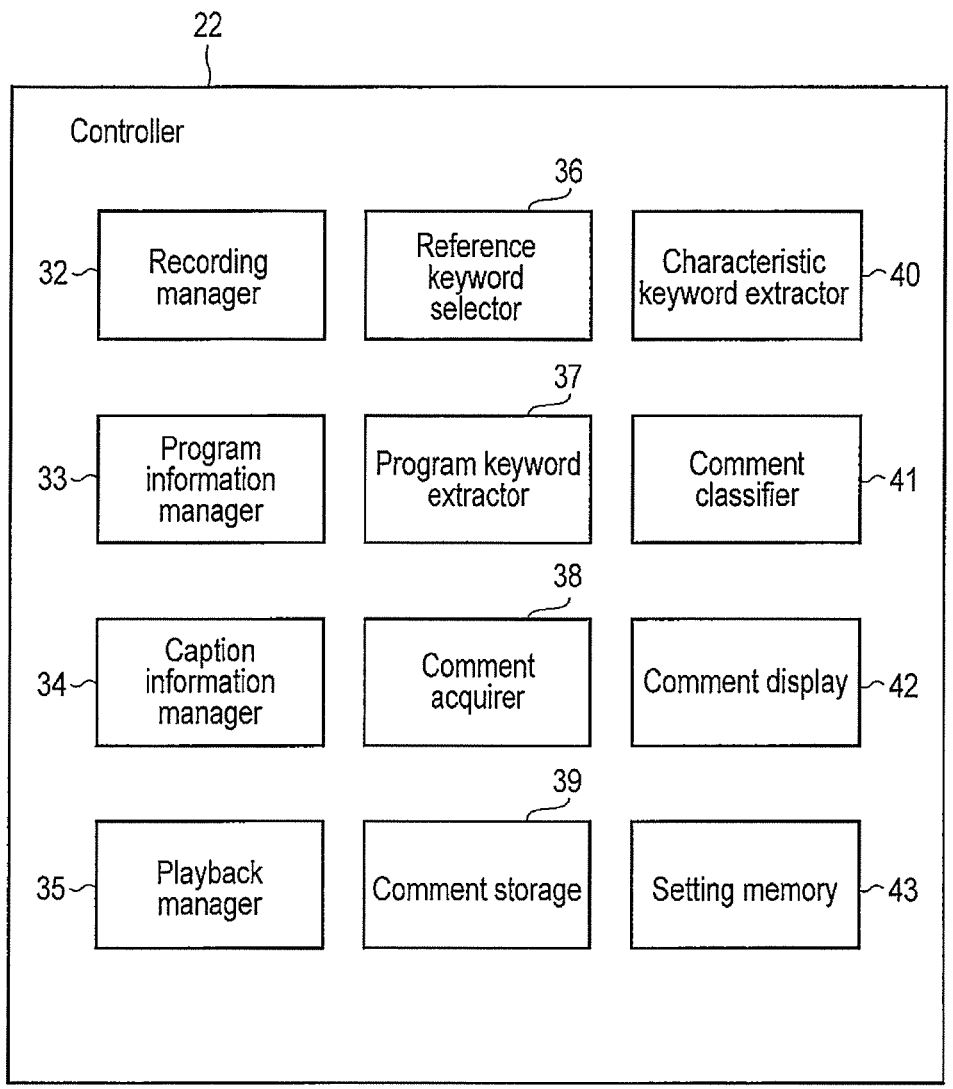
FIG. 2 is a block diagram for illustrating an example of a controller of the digital television broadcast receiving apparatus according to the embodiment.
FIG. 3 is a view for illustrating an example of a processing operation performed by the controller of the digital television broadcast receiving apparatus according to the embodiment for selecting a reference keyword.

Various embodiments will be described hereinafter with reference to the accompanying drawings.

In general, according to one embodiment, a video playback apparatus comprises a recorder, storage, a setter, a classifier and a display controller. The recorder is configured to receive and record a program. The storage is configured to acquire and store comments through a network. The setter is configured to set a keyword for searching for a comment on the program recorded by the recorder, from the comments stored in the storage. The classifier is configured to classify on which program recorded by the recorder the comment stored by the storage is made, based on the keyword set by the setter. The display controller is configured to, when playing back the program recorded by the recorder, perform control to display the comment classified by the classifier as a comment on the program, and the program.

FIG. 1 schematically illustrates a signal processing system of a digital television broadcast receiving apparatus 11 described with this embodiment. This digital television broadcast receiving apparatus 11 has a function of supporting a broadcasting/communication collaboration system which combines a broadcasting service and a communication service using a network.

That is, a digital television broadcast signal received at an antenna 12 is supplied to a tuner 14 through an input terminal 13 to select a broadcast signal of a desired channel. The broadcast signal selected by this tuner 14 is supplied to a demodulator/decoder 15, is restored to a digital video signal and audio signal and then is output to a signal processor 16.

This signal processor 16 applies predetermined digital signal processing to the digital video signal and audio signal supplied from the demodulator/decoder 15. Further, the signal processor 16 outputs the digital video signal to a synthesis processor 17, and outputs the digital audio signal to an audio processor 18.

The synthesis processor 17 superimposes an on screen display (OSD) signal on the digital video signal supplied from the signal processor 16, and outputs the digital video signal. The digital video signal output from this synthesis processor 16 is supplied to a video processor 19, is converted into an analog video signal in a format which can be displayed on a video image display panel 20 at a later stage, and is supplied to the video image display panel 20 to use for video image display.

Further, the audio processor 18 converts the input digital audio signal into an analog audio signal in a format which can be played back by a speaker 21 at a later stage. Furthermore, the analog audio signal output from this audio processor 18 is supplied to the speaker 21 to use for audio playback.

Meanwhile, with this digital television broadcast receiving apparatus 11, a controller 22 controls various overall operations including the various receiving operations. This controller 22 has a built-in central processing unit (CPU) 22a, and receives operation information from an operator 23 provided in a body of the digital television broadcast receiving apparatus 11 or operation information transmitted from a remote controller 24 and received by a light receiver 25 to control each unit such that operation content is reflected.

In this case, the controller 22 uses a memory 22b. This memory 22b mainly has a read only memory (ROM) which stores a control program executed by the CPU 22a, a random access memory (RAM) which provides a working area to the CPU 22a and a non-volatile memory which stores various pieces of setting information and control information.

Further, this controller 22 is connected with a hard disk drive (HDD) 26. This controller 22 performs control to make a recording playback processor 27 encrypt the digital video signal and audio signal obtained from the demodulator/decoder 15 based on a user's operation of the operator 23 or the remote controller 24 and convert the signals into predetermined recording formats, and then supply the signals to the HDD 26 and record the signals in the hard disk 26a.

Further, this controller 22 can perform control to make the HDD 26 read the digital video signal and audio signal from the hard disk 26a based on a user's operation of the operator 23 or the remote controller 24, and make the recording playback processor 27 decode the signals and then supply the signals to the signal processor 16 in order to use for video image display and audio playback as described above.

Furthermore, the recording playback processor 27 is connected with an input terminal 28. This input terminal 28 receives direct inputs of a digital video signal and audio signal from outside the digital television broadcast receiving apparatus 11. The digital video signal and audio signal input through this input terminal 28 are supplied to the recording playback processor 27 based on control by the controller 22 and then to the signal processor 16 to subsequently use for video image display and audio playback.

Further, the digital video signal and audio signal input through this input terminal 28 is supplied to the recording playback processor 27 based on control by the controller 22, and is used to be recorded and played back in the hard disk 26a by the HDD 26.

Furthermore, the controller 22 is connected with a network interface 29. This network interface 29 is connected to an external network 30. Further, this network 30 is connected with a network server 31 which provides various services using a communication function through the network 30.

Hence, the controller 22 can access the network server 31 and communicate information through the network interface 29 and the network 30 based on a user's operation of the operator 23 or the remote controller 24 to utilize service (for example, SNS) provided in the network server 31.

FIG. 2 illustrates an example of various functions of the controller 22 for causing the digital television broadcast receiving apparatus 11 to execute the following characteristic processing operation. That is, this controller 22 has a recording manager 32, a program information manager 33, a caption information manager 34, a playback manager 35, a reference keyword selector 36, a program keyword extractor 37, a comment acquirer 38, a comment storage 39, a characteristic keyword extractor 40, a comment classifier 41, a comment display 42 and a setting storage 43.

In this case, the recording manager 32 manages a recording operation of recording a program and related information of the program of a broadcast channel set in advance from the received digital television broadcast signal, in the HDD 26 in a range of a time set in advance. The program information manager 33 acquires program information such as electronic program guide (EPG) from related information of the program recorded in the HDD 26 based on management by the recording manager 32, and stores and manages these pieces of information in program units.

The caption information manager 34 acquires caption information of a program and stores and manages the caption information in program units based on management by the recording manager 32 when the program recorded in the HDD 26 has the caption information. The playback manager 35 executes, for example, a playback operation of a program recorded in the HDD 26 in advance and management of playback position information of the program which is played back based on a user's operation of the operator 23 or the remote controller 24.

The reference keyword selector 36 selects a reference keyword utilized to acquire, for example, a comment in a SNS from the external network server 31 based on channel information of a program which is currently played back. The program keyword extractor 37 acquires program information and caption information of a program from the program information manager 33 and the caption information manager 34 for a given program, and extracts a characteristic keyword which appears in the program from these pieces of information.

The comment acquirer 38 acquires, for example, a comment in a SNS from the external network server 31 according to time information such as a broadcast start time or a broadcast end time of a program, and a reference keyword selected by the reference keyword selector 36 based on channel information of the program. The comment storage 39 stores the comment acquired by the comment acquirer 38 in broadcast time units of the program based on a posting time of the comment.

The characteristic keyword extractor 40 analyzes the comments stored in the comment storage 39 in program units, and compares the comments with comments on preceding and following programs to extract characteristic keywords from the comments. The comment classifier 41 classifies a relationship to a program as to whether a comment is made on a program which is currently played back, is made on a preceding or following program or does not belong to any program, based on the keywords extracted for individual programs by the program keyword extractor 37 and the characteristic keyword extractor 40.

The comment display 42 executes processing of selecting a comment to be displayed to a user according to a playback situation of the current program based on the comment classified by the comment classifier 41, and changing a color or a size of a specific keyword in the comment when the comment is displayed. The setting storage 43 stores various pieces of setting information indicating how to display which classification of a comment.

FIG. 3 illustrates an example of a rule of selecting a reference keyword which serves as a search key when acquiring, for example, a comment in a SNS from the external network server 31 based on channel information of a program. With the example illustrated in FIG. 3, a broadcasting station is specified based on two pieces of identification information of a service ID and a network ID determined in advance to uniformly identify the broadcasting station, and a reference keyword is determined for the combination of both IDs.

When, for example, the service ID of a program which is currently viewed is "12345" and the network ID is "32112", the broadcasting station decides QBS and the reference keyword is "#QBS". In addition, although the reference keyword is selected from the service ID and the network ID with this example, the reference keyword may be selected from information such as a broadcasting organization except the service ID and the network ID.

Further, in case of service for which a rule for selecting a reference keyword in advance cannot be set, a program keyword which is described below is used instead of a reference keyword. Furthermore, although one reference keyword is selected for one broadcasting station with the example illustrated in FIG. 3, it is possible to select a plurality of reference keywords for one broadcasting station and use the sum (or) or the product (and) of these reference keywords as a search key. Still further, a plurality of broadcasting stations may have one identical reference keyword. Moreover, other reference keywords may be selected for respective external services.

Figure 4:
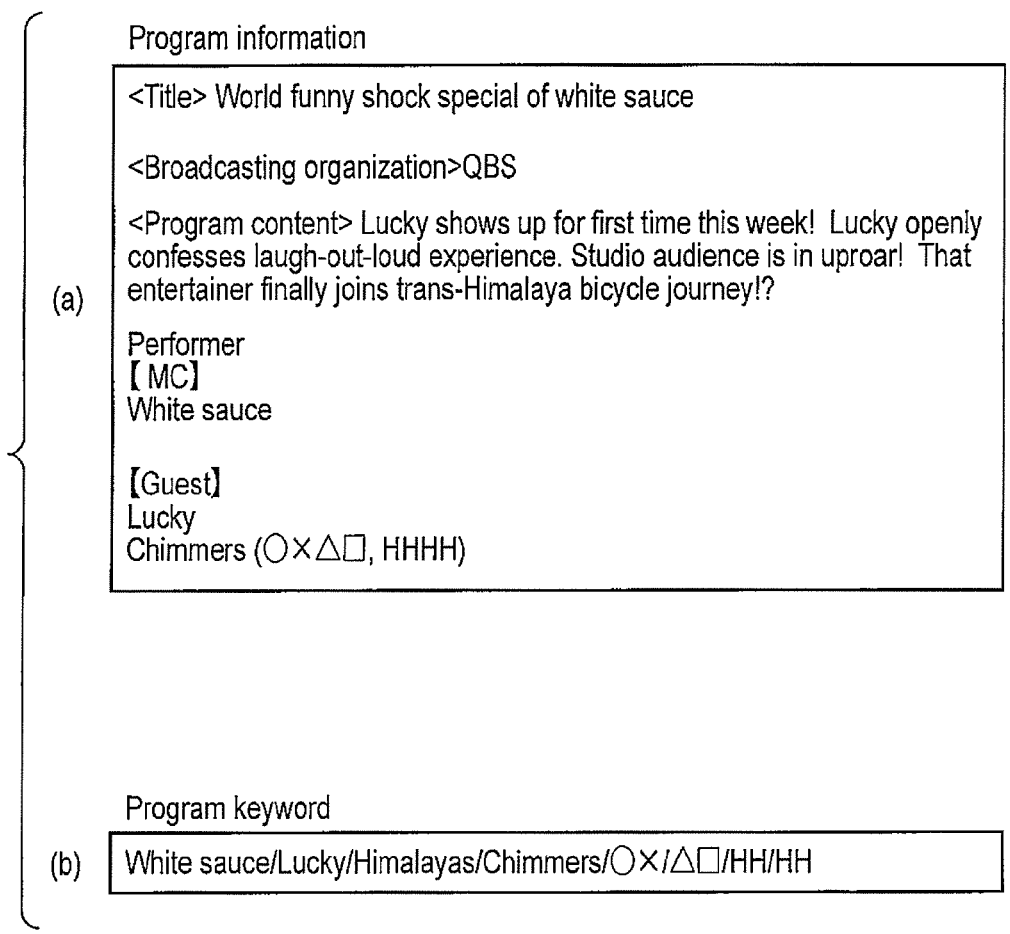
FIG. 4 is a view for illustrating an example of a processing operation performed by the controller of the digital television broadcast receiving apparatus according to the embodiment for extracting a program keyword.

FIG. 4 illustrates an example of extracting a program keyword indicated in symbol (b) from program information indicated by symbol (a). The program information is basically sent with sentences, and therefore proper names such as names of people and names of places are extracted from these sentences. In this case, the proper names are extracted using a technique such as general morphological analysis.

That is, as disclosed in, for example, Jpn. Pat. Appln. KOKAI Publication No. 2009-159475, a proper name is extracted using a method of clipping a noun and a noun phrase which serve as keyword candidates using a morphological analyzer and deciding whether or not a word is adequate as a keyword using a dictionary set in advance of the clipped noun and noun phrase, or a method of clipping, for example, a name of a person according to a rule set in advance.

With the example illustrated in FIG. 4, "White sauce", "Lucky", "Chimmers" "○×Δ□" (the family name is ○× and the first name is Δ□) and "HHHH" (the family name is HH and the first name is HH) are extracted as names of people, and "Himalaya" is extracted as a name of a place from a title and a column of program content, and these are used as program keywords of this program.

In addition, although extraction of a program keyword from program has been described with the above example, it is possible to extract a program keyword likewise for caption information. That is, by performing processing such as morphological analysis for text information extracted from a caption, it is possible to extract a program keyword.

FIG. 5 illustrates an example of acquiring the characteristic keyword from the external network server 31 by the comment acquirer 38, and extracting a characteristic keyword [indicated by symbol (b)] for a program from a comment in a SNS [indicated by symbol (a)] stored by comment storage 39 in broadcast time units of the program.

Although a characteristic comment is extracted for a comment using a technique such as morphological analysis similar to program information or caption information, characters in the comment can be identified as a keyword using a specific symbol depending on service in this case, so that it is possible to set these rules per service in advance, and utilize the rules.

With the example illustrated in FIG. 5, a symbol "#" is used to represent a keyword, so that it is possible to recognize as a characteristic keyword a word starting from "#" without performing processing such as morphological analysis in particular. With the example in FIG. 5, "#QBS", "#whiteshow", "#news777", "#TVKANTO", "#TOSHITV", "#MUKASH-ITV", and "#ciaosports" are keywords which meet this condition.

Threshold processing is performed for a keyword extracted in this way based on, for example, the number of appearances to use a keyword which appears a fixed number of times or more as a characteristic keyword for a comment on this program. In addition, the absolute number of the number of appearances changes depending on the duration of a program, so that it is possible to determine a threshold by an evaluation function using a program broadcast time as an argument.

Further, it is also possible to determine a characteristic keyword using a criterion that the rate that an applicable keyword is included in comments made within the broadcast time of a program is a fixed value or more instead of the number of appearances. In addition, with this example, a keyword such as "#news777" which appears a small number of times is not a characteristic keyword. Further, although details will be described below, it is also possible to determine a characteristic keyword based on not only a keyword extracted from the program but also a relationship to keywords extracted from preceding and following programs.

FIG. 6 illustrates a flowchart summarizing an example of a processing operation by the comment classifier 41 of the controller 22 of classifying on which program a comment is made or a comment is not made on any program based on a program keyword and a characteristic keyword.

That is, when processing is started (step S1), the comment classifier 41 decides whether or not there is a comment which is not processed in a set of comments posted within a broadcast time of a given program in step S2, and, when deciding that there is not such a comment (NO), finishes the processing (step S3).

Further, when it is decided in step S2 that there is a comment which is not processed (YES), in step S4, the comment classifier 41 acquires one comment which is not processed, and decides in step S5 whether or not a characteristic keyword of the program is included in the acquired comment.

Furthermore, when it is decided that the characteristic keyword is included in the comment (YES), in step S6, the comment classifier 41 classifies the comment as a comment posted for content of the program, and proceeds to processing in step S2.

Still further, when it is decided in step S5 that the characteristic keyword of the program is not included in a comment (NO), in step S7, the comment classifier 41 decides whether or not the program keyword of the program is included in this comment.

Meanwhile, when it is decided that the program keyword is included in a comment (YES), in step S6, the comment classifier 41 classifies the comment as a comment posted for content of the program, and proceeds to processing in step S2.

Further, when it is decided in step S7 that the program keyword of the program is not included in a comment (NO), that is, when both of a characteristic keyword and a program keyword of the program are not included in the comment, the comment classifier 41 decides in step S8 whether or not characteristic keywords of programs broadcasted before and after the program are included in this comment.

Furthermore, when it is decided that the characteristic keywords of preceding and following programs are included in a comment (YES), in step S9, the comment classifier 41 classifies this comment as a comment posted for content of the preceding and following programs, and proceeds to processing in step S2.

Still further, when deciding in step S8 that the comment includes no characteristic keyword of preceding and following programs (NO), the comment classifier 41 classifies in step S10 whether or not program keywords of preceding and following programs are included in this comment.

Meanwhile, when it is decided that program keywords are included in the comment (YES), in step S9, the comment classifier 41 classifies this comment as a comment posted for content of preceding and following programs, and proceeds to processing in step S2.

Further, when it is decided in step S10 that program keywords of preceding and following programs are not included in the comment (NO), that is, neither characteristic keyword of the program, program keyword of the program, characteristic keywords of preceding and following programs nor program keyword of preceding and following programs are included in the comment, in step S11, the comment classifier 41 classifies this comment as other comments, and proceeds to processing in step S2.

By performing the above processing operation for all comments posted within a broadcast time of the program, it is possible to classify the comments into comments of the program, comments of preceding and following programs and other comments.

In addition, when whether or not characteristic keywords are included in comments is decided, a reference keyword is removed from the characteristic keyword. This is because the acquired comment including the reference keyword is basically acquired and the reference keyword is included in all comments, and therefore is invalid as a decision criterion.

FIG. 7 illustrates an example of characteristic keywords extracted from comments stored in the comment storage 39 on a given program (world funny shock special of white sauce), and characteristic keywords extracted from comments stored in the comment storage 39 on preceding and following programs (news 777 and world farm tour biomass energy and corn field in America).

With this embodiment, to acquire a comment using a reference keyword as a search key, the reference keyword is basically the head of the number of appearances of characteristic keywords of comments on all programs. That is, although "#QBS" is a characteristic keyword which appears the most frequently in all programs with the example illustrated in FIG. 7, the reference keyword may not be used as a characteristic keyword as described above.

Further, when a characteristic keyword is extracted from the comments stored in the comment storage 39 for a give program, it is possible to determine a characteristic keyword of the program by comparing a characteristic keyword extracted for the program and the characteristic keyword extracted for preceding and following programs of this program.

Although a characteristic keyword "#news777" appears in a broadcast time with "world funny shock special of white sauce" in the example illustrated in FIG. 7, this characteristic keyword becomes a characteristic keyword of a high appearance frequency in "news 777" which is the preceding program. In view of this, a characteristic keyword which has a high appearance frequency in the preceding program and which appears particularly in the first half of the subsequent program cannot be decided as a characteristic keyword of the program, and a comment including this characteristic keyword can be consistently decided as a comment posted as a comment on the program depending on a time lag of an input of a comment of the preceding program.

As described above, the characteristic keyword extracted for the program is decided as characteristic keywords of preceding and following programs, so that it is possible to efficiently identify and classify on which program a comment including this characteristic keyword is made.

Meanwhile, a specific example of a processing operation of classifying on which program which comment is made will be described using various comments indicated by symbol (a) in FIG. 5 as an example. First, a top comment "Oh, white show has started. #QBS #whiteshow" includes a characteristic keyword "#whiteshow", and therefore can be identified as a comment on "world funny shock special of white sauce".

Further, similarly, the next comment "Today's guest is Lucky #QBS #whiteshow" includes a characteristic keyword "#whiteshow", and can be identified as a comment on "world funny shock special of white sauce".

The next comment "Disaster restoration is quite slow . . . #QBS #news777" includes a keyword "#news777" which is not a characteristic keyword of "world funny shock special of white sauce" and cannot be decided as a comment related to the program, and this comment does not include a program keyword indicated by symbol (b) in FIG. 4 and therefore is not identified as a comment on the program.

In this case, the same comment "Disaster restoration is quite slow . . . #QBS #news777" is compared with characteristic keywords of preceding and following programs of "world funny shock special of white sauce". Hence, "#news777" is included in characteristic keywords of "news777" which is the preceding program, and therefore this comment is classified as a comment on preceding and following programs.

Although the next comment "HH is going wild today, too #QBS" does not include a characteristic keyword of "world funny shock special of white sauce", this comment includes "HH" which is a program keyword, and therefore can also be identified as a comment on the program.

The next comment "You don't generally go to Himalaya #QBS #whiteshow" includes "#whiteshow" similar to the above, and therefore is classified as a comment on "world funny shock special of white sauce".

The next comment "[RT if you like] We are gonna have a live concert in Shibuya on 18. For more information, please check http://******** #QBS #TVKANTO #TOSHITV #MUKASHITV" includes various keywords which appear and do not include keywords corresponding to a characteristic keyword and a program keyword of "world funny shock special of white sauce" and preceding and following programs, and therefore is classified as other comments.

The above classifying processing is performed for all comments stored in the comment storage 39 in a broadcast time of "world funny shock special of white sauce", so that a comment on the program can be identified.

Figure 8:
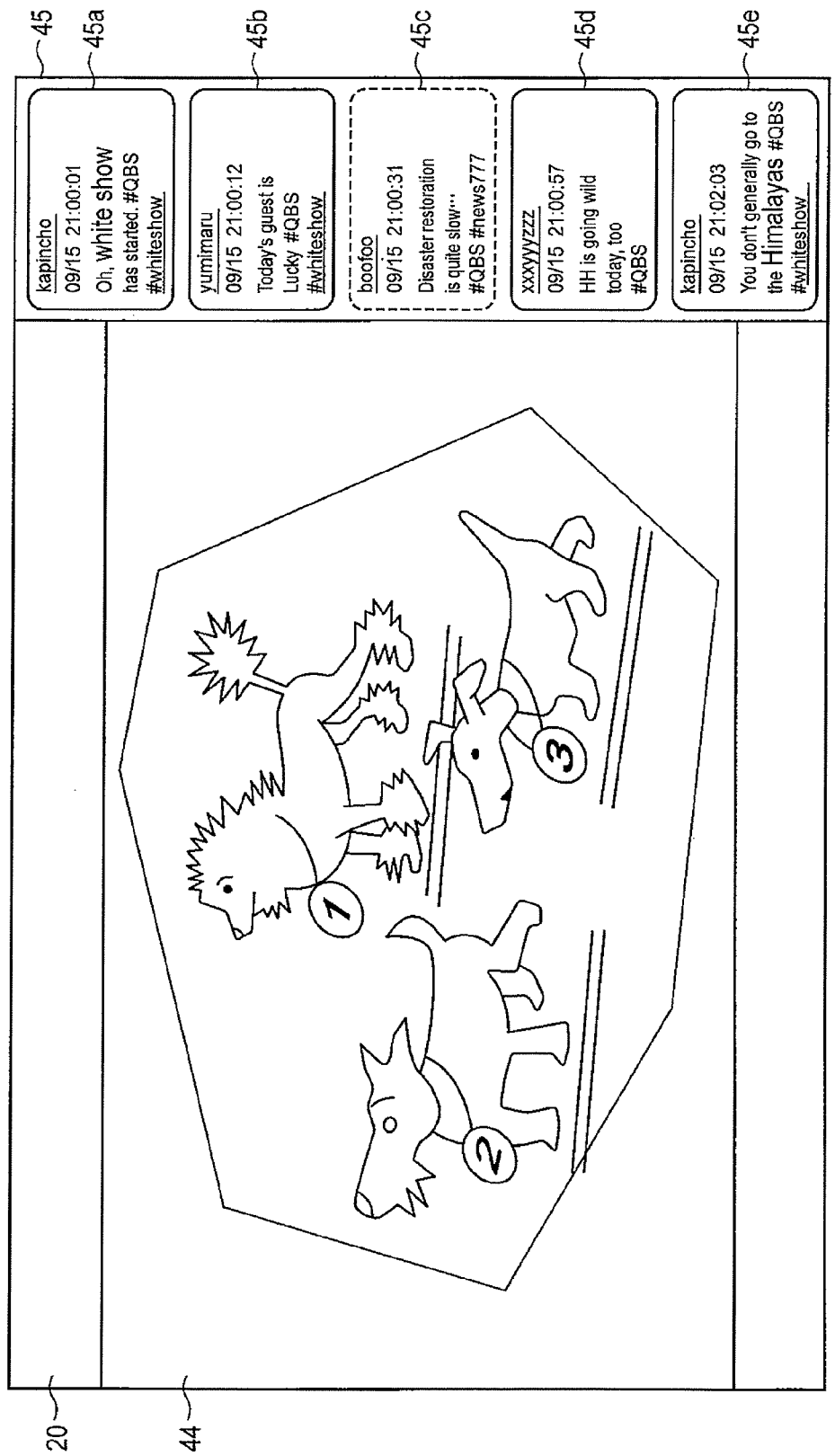
FIG. 8 is a view for illustrating an example of a display screen displayed on the digital television broadcast receiving apparatus according to the embodiment.

FIG. 8 illustrates an example of displaying as a video image a comment classified as described above and a program recorded in the HDD 26 on the video image display panel 20. That is, a screen of the video image display panel 20 is divided into an area 44 which displays a video image of a program played back by the HDD 26 (in this case, world funny shock special of white sauce), and an area 45 which displays comments. Further, in the area 45 which displays comments, a plurality (five in FIG. 8) of comments 45*a* to 45*e* are displayed. In addition, comments can be scrolled in a vertical direction by operating the remote controller 24.

In this case, as described above, the comments stored in the comment storage 39 are classified into comments on the program, comments on preceding and following programs and other comments, so that display can be changed according to this classification.

With the example illustrated in FIG. 8, the comments 45*a*, 45*b*, 45*d* and 45*e* on the program (World funny shock special of white sauce) are displayed with green frames, and the comment 45*c* on preceding and following programs is displayed with a blue frame. Further, although not displayed, the other comments may not be displayed.

Furthermore, with the comments 45*a*, 45*b*, 45*d* and 45*e* on the program (World funny shock special of white sauce), the first comment 45*a* also includes a characteristic keyword which is "white show", and therefore a font size of this characteristic keyword portion is increased to display the characteristic keyword distinguishably for users.

In addition, by underlining like "#whiteshow" a keyword matching a rule of a service provider side in advance as a characteristic keyword, the characteristic keyword can be distinguished from other keywords.

Further, the second comment 45*b* and the fourth comment 45*d* which include a program keyword for the program (world funny shock special of white sauce) can be easily identified by users by performing processing of, for example, displaying the program keyword by changing the color of the program keyword from other characters.

As described above, performing processing of changing a characteristic keyword or a program keyword which appears in a comment by changing a display mode such that the user can easily identify the characteristic keyword or the program keyword at a glance. Further, for these display and decoration of characters, it is convenient for users to hold information as to which classification of a comment is displayed or is not displayed, or what font size or color is used to highlight a keyword by making a setting in advance. Furthermore, instead of a characteristic keyword or a program keyword extracted from a comment or program information, a keyword registered by a user in advance can be, for example, highlighted.

According to the above embodiment, when a broadcast program and a related comment communicated by external service such as a SNS is recorded and played back, a keyword for searching for a comment of a program to be played back from multiple recorded comments is set, and the comment searched for based on the keyword is displayed together with a video image of a program, so that the user can efficiently watch the comments on the program to be played back.

In addition, by automatically performing processing of setting a reference keyword, program keywords and characteristic keywords and classifying comments from various types of these keywords per program every time, for example, a recording operation of a broadcast program or a comment is finished, it is possible to display the program and the comments when request of playing back the program and the comments is made, which is convenient.

Further, although a reference keyword is determined according to the rule set in advance by the reference keyword selector 36 to select the reference keyword with the above example, selection of the reference keyword is by no means limited to this, and a mechanism may be provided which, when, for example, program information is sent to an external server, decides a program on a server side, determines the reference keyword and replies the reference keyword.

Furthermore, a configuration may be employed where an external server collectively performs extraction processing of a program keyword or a characteristic keyword instead of extracting a program keyword or a characteristic keyword using, for example, the program keyword extractor 37 or the characteristic keyword extractor 40, and the processing result is received from the external server.

Still further, although comments are displayed on the video image display panel 20 of the digital television broadcast receiving apparatus 11 with the above embodiment, the embodiment is by no means limited to this, and comments may be configured to be displayed by external apparatus such as mobile telephones, smartphones, tablets, and personal computers (PC). In this case, a mechanism which communicates with these apparatus is additionally required.

Further, a configuration is also employed where a playback apparatus outputs only information related to a program, and all external apparatus (a server, a smartphone, a tablet and a PC) perform, for example, extracting processing of keywords and classifying processing of comments other than the outputting information.

Furthermore, the comment display 42 can receive a playback position of a current program from the playback manager 35, specify time information of the program held by the program information manager 33 and a time at which this scene is broadcasted in real time, and determine which comment to display for users according to the specified time.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video playback apparatus comprising:
a recorder configured to receive and record a plurality of programs, the plurality of programs including a first program and a second program, the second program being broadcast at a different time than the first program;
a storage configured to acquire and store comments through a network;
a setter configured to extract a plurality of keywords from a first comment acquired by the storage during a first broadcast time period corresponding to the first program recorded by the recorder or a second comment acquired by the storage during a second broadcast time period corresponding to the second program recorded by the recorder, and to set a keyword as a characteristic keyword for at least the first program or the second program, the keyword being chosen based on the frequency of appearance of each keyword of the plurality of keywords, the second broadcast time period being different than the first broadcast time period;
a classifier configured to select on which program recorded by the recorder the comment stored by the storage is made based on the keyword set by the setter; and
a display controller configured to, when playing back the program recorded by the recorder, perform control to display the program and the selected comment.

2. The video playback apparatus of claim 1, wherein the storage is configured to acquire the comment through the network based on time information related to the first program and a reference keyword set based on channel information of the first program, and store the acquired comment of the first program based on a posting time and date.

3. The video playback apparatus of claim 1, wherein the display controller is configured to specify a time at which a first scene is broadcasted in real time based on a playback position of a current program and time information of the first program, and determine which comment to display according to the specified time.

4. A video playback apparatus comprising:
a recorder configured to receive and record a plurality of programs, the plurality of programs including a first program and a second program;
a storage configured to acquire and store comments through a network;
a setter configured to extract a program keyword from caption information of one of the plurality of the program recorded by the recorder, and extract a characteristic keyword from a comment acquired by the storage during a broadcast time period for the one of plurality of programs recorded by the recorder;
a classifier configured to classify the comment into a comment corresponding to the program based on classifying the comments stored in the storage into one of (i) a first group of comments corresponding to the first program based on classifying the comments stored in the storage, (ii) a second group of comments including a characteristic keyword or a program keyword corresponding to the first program, or (iii) a third group of comments including a characteristic keyword or a program keyword corresponding to the second program; and
a display controller configured to, when playing back the one of plurality of programs recorded by the recorder, perform control to display the one of the plurality of programs and the classified comment.

5. The video playback apparatus of claim 4, wherein the display controller is configured to, when the characteristic keyword or the program keyword is included in the comment, perform control to change a display mode of the characteristic keyword or the program keyword and display the characteristic keyword or the program keyword.

6. The video playback apparatus of claim 5, wherein the display controller is configured to perform control to change a color or a size of the characteristic keyword or the program keyword, and display the characteristic keyword or the program keyword.

7. A video playback method comprising:
receiving and recording a plurality of programs;
acquiring and storing comments through a network;
extracting a plurality of keywords from a first comment acquired by the storage during a first broadcast time period corresponding to a first program recorded by the recorder or a second comment acquired by the storage during a second broadcast time period corresponding to a second program recorded by the recorder, the second broadcast time period being different than the first broadcast time period;
setting a keyword as a characteristic keyword for at least the first program or the second program, the keyword being chosen based on the frequency of appearance of each keyword of the plurality of keywords;
classifying on which program the first or second comment is made, based on the set keyword; and
when the first program or the second program is played back, performing control to display the first program or the second program and the classified comment.

8. A video playback method comprising:
receiving and recording a plurality of programs, the plurality of programs including a first program and a second program, the second program being broadcast at a time different than the first program;
acquiring and storing comments through a network;
extracting a program keyword from caption information of one of the plurality of programs recorded by the recorder, and extracting a characteristic keyword from a comment acquired by the storage for the one of the plurality of programs recorded by the recorder;
classifying the comment acquired by the storage into one of (i) a first group of comments corresponding to the characteristic keyword of the first program, or (ii) a second group of comments corresponding to the characteristic keyword of the second program; and
when the recorded program is played back, performing control to display the one of the plurality of programs to which the comment is associated and the comment.

9. A video playback apparatus comprising:
a recorder configured to receive and record a plurality of programs, the plurality of programs including a first program and a second program, the second program being broadcasted at a time different than the first program;
a storage configured to acquire and store a plurality of comments through a network;
an extractor configured to extract a characteristic keyword from the comments stored in the storage for the plurality of programs recorded by the recorder;
a classifier configured to classify each of the plurality of comments into one of (i) a first group of comments corresponding to the first program based on classifying the comments stored in the storage, or (ii) a second group of comments corresponding to a characteristic keyword or a program keyword of the first program, or (iii) a third group of comments corresponding to a characteristic keyword or a program keyword of the second program; and
a display controller configured to, when playing back the program recorded by the recorder, perform control to display the program and the classified comment.

10. The video playback apparatus of claim 9, wherein the display controller is configured to specify a time at which a first scene is broadcasted in real time based on a playback position of a current program and time information of the program recorded by the recorder, and determine which comment is to be displayed according to the specified time.

11. A video playback apparatus comprising:
a recorder configured to receive and record a plurality of programs, the plurality of programs including a first program and a second program, the second program being broadcasted at a time different than the first program;
a storage configured to acquire and store a plurality of comments through a network;
the extractor configured to extract a characteristic keyword from the plurality of comments;
a classifier configured to classify the each of the plurality of comments into one of (i) a first group of comments corresponding to the first program based on classifying the comments stored in the storage, or (ii) a second group of comments corresponding to the characteristic keyword of the first program, or (iii) a third group of comments corresponding to the characteristic keyword corresponding to the second program; and
a display controller configured to, when playing back the program recorded by the recorder, perform control to display the program and the classified comment.

12. The video playback apparatus of claim 11, wherein the display controller is configured to specify a time at which a first scene is broadcasted in real time based on a playback position of a current program and time information of the program recorded by the recorder, and determine which comment is to be displayed according to the specified time.

13. A video playback apparatus comprising:
a recorder configured to receive and record a plurality of programs, the plurality of programs including a first program and a second program, the second program being broadcasted at a time different than the first program;
a storage configured to acquire the comment through the network based on time information related to a program recorded by the recorder and a reference keyword set based on channel information of the program recorded by the recorder, and store the acquired comment of the program based on a posting time and date;
an extractor configured to extract a characteristic keyword from the comments stored in the storage for the plurality of programs recorded by the recorder;
a classifier configured to classify the comments into a comment corresponding to the program based on classifying the comments stored in the storage into one of (i) a first group of comments corresponding to the first program based on classifying the comments stored in the storage, (ii) a second group of comments including a characteristic keyword or a program keyword corresponding to the first program, or (iii) a third group of comments including a characteristic keyword or a program keyword corresponding to the second program; and
a display controller configured to, when playing back the program recorded by the recorder, perform control to display the program and the classified comment.

14. The video playback apparatus of claim 13, wherein the classifier is configured to classify the each of the plurality comments into one of (i) a first group of comments corresponding to the first program based on classifying the comments stored in the storage, (ii) a second group of comments corresponding to the first program based on classifying the comments stored in the storage, or (iii) a third group of comments different than the first group and second group.

15. The video playback apparatus of claim 13, wherein the display controller is configured to specify a time at which a first scene is broadcasted in real time based on a playback position of a current program and time information of the program recorded by the recorder, and determine which comment is to be displayed according to the specified time.

16. The video playback apparatus of claim 13, wherein the display controller is configured to, when the characteristic keyword or the program keyword which is classified for the comment is included in the comment to be displayed, perform control to change a display mode of the characteristic keyword or the program keyword and display the characteristic keyword or the program keyword.

17. The video playback apparatus of claim 13, wherein the display controller is configured to perform control to change a color or a size of the characteristic keyword or the program keyword, and display the characteristic keyword or the program keyword.

18. A video playback method comprising:
receiving and recording a plurality of programs, the plurality of programs including a first program and a second program, the second program being broadcasted at a time different than the first program;
acquiring and storing a plurality of comments through a network;
extracting a program keyword from program information land a characteristic keyword from the comments stored in the storage for the plurality of programs recorded by the recorder;
classifying the comments into a comment corresponding to the program based on classifying the comments stored in the storage into one of (i) a first group of comments corresponding to the first program based on classifying the comments stored in the storage, (ii) a second group of comments including a program keyword corresponding to the first program, or (iii) a third group of comments including a program keyword corresponding to the second program; and
when playing back the program recorded by the recorder, performing control to display the program and the classified comment.

19. A video playback method comprising:
receiving and recording a plurality of programs, the plurality of programs including a first program and a second program, the second program being broadcasted at a time different than the first program;
acquiring and storing a plurality of comments through a network;
extracting a characteristic keyword from the comments stored in the storage for the plurality of programs recorded by the recorder;
classifying the comments into a comment corresponding to the program based on classifying the comments stored in the storage into one of (i) a first group of comments corresponding to the first program based on classifying the comments stored in the storage, (ii) a second group of comments including a characteristic keyword corresponding to the first program, or (iii) a third group of comments including a characteristic keyword corresponding to the second program; and
when playing back the program recorded by the recorder, performing control to display the program and the classified comment.

20. A video playback method comprising:
receiving and recording a plurality of programs, the plurality of programs including a first program and a second program, the second program being broadcasted at a time different than the first program;
acquiring the comment through the network based on time information related to a program recorded by the recorder and a reference keyword set based on channel information of the program recorded by the recorder, and storing the acquired comment of the program based on a posting time and date;
extracting a characteristic keyword from the comments stored in the storage for the plurality of programs recorded by the recorder;
classifying the comments into a comment corresponding to the program based on classifying the comments stored in the storage into one of (i) a first group of comments corresponding to the first program based on classifying the comments stored in the storage, (ii) a second group of comments including a characteristic keyword or a program keyword corresponding to the first program, or (iii) a third group of comments including a characteristic keyword or a program keyword corresponding to the second program; and when playing back the program recorded by the recorder, performing control to display the program and the classified comment.

* * * * *